United States Patent [19]

Azzimonti

[11] Patent Number: 5,121,574
[45] Date of Patent: Jun. 16, 1992

[54] SYSTEM FOR CONTROLLING POSSIBLE SHIFTING OF PANELS IN STRUCTURAL FACADES

[75] Inventor: Giovanni Azzimonti, Novara, Italy

[73] Assignee: Azzimonti Paolino S.P.A., Caltignaga, Italy

[21] Appl. No.: 550,857

[22] Filed: Jul. 10, 1990

[51] Int. Cl.$^5$ .............................. E04B 1/38; E06B 3/54
[52] U.S. Cl. .................................... 52/235; 52/1; 52/475; 52/506
[58] Field of Search .................... 52/1, 235, 474, 475, 52/476, 506, 508

[56] References Cited

U.S. PATENT DOCUMENTS 2,209,527 7/1940 Knuosen ................................. 52/1
3,992,927 11/1976 Troeh .

FOREIGN PATENT DOCUMENTS 0195662 9/1986 European Pat. Off. .
0251834 1/1988 European Pat. Off. .
346143 12/1921 Fed. Rep. of Germany .
2659536 11/1977 Fed. Rep. of Germany .
87-162202 5/1988 Fed. Rep. of Germany .

Primary Examiner—Michael Safavi
Attorney, Agent, or Firm—Young & Thompson

[57] ABSTRACT

A structural facade system comprises a flat facing panel (22) lying in a plane, a bearing structure (14) which carries the panel, and a sealant (16) between the bearing structure and the panels. A sensor (18) is mounted on the bearing structure, and a sensor operating element (22) is mounted on the panels. The sensor operating element has an arm secured to the panel and extending transversely of the plane of the panel. The arm terminates in an end remote from the panel which cooperates with the sensor to detect movement of the panel in a direction transverse to the plane of the panel.

6 Claims, 3 Drawing Sheets

SYSTEM FOR CONTROLLING POSSIBLE SHIFTING OF PANELS IN STRUCTURAL FACADES

The present invention refers to the field of structural facades or continuous facades, such as are widely used in building at the moment. Such facades comprise a facing of panels on a bearing structure, generally panes of glass on view, positioned adjacent to each other.

For aesthetic reasons the panes are usually required to be adjacent without the bearing means between them being visible. This entails the panes of glass (monolithic panes, or double-glazed insulating panes), used in accordance with present day constructive solutions, being fixed to the metal bearing structure by means of sealants, for example elastic silicone sealants.

One drawback of this type of glazing is that not enough is known about the behaviour of these sealants in the long term or in abnormal conditions, which might be produced by the diffusion of certain gases or chemical products in the atmosphere; in addition, not enough is known about the behaviour of these connections when material other than glass is involved, for example a reflective coating on the glass itself or anodizing or painting on a metal surface to which the silicone adheres.

In order to increase the degree of safety of these facades, mechanical checking systems are sometimes used which, however, are not well received by architects because they are often visible on the facade; or it is necessary to cut niches into the thickness of the glass to render these mechanical systems less visible, which weakens the pane of glass itself and increases its cost.

The aim of this invention is to increase the safety of continuous facades or, in other words, to avoid unexpected falls of glass panels from structural facades.

To achieve this aim it has been observed that, under particularly critical conditions, that is when adhesion is not reliable because of the sealant, the reflective coating or suchlike, a panel will shift slightly well before actually breaking away completely from the supporting or bearing structure. These slight shifts are generally more notable in correspondence with the upper edge of the panel since the panel itself usually rests with its lower edge on a base of the section of the structure. Therefore, in this invention, it has been decided to take note of any slight shifts of the panel, especially at its upper edge, and to use such shifts to signal that the panel itself is in a dangerous state.

According to this invention a sensor is provided capable of detecting any shifts, for each panel or for panels specially chosen for sampling. In particular, the sensor will be located on a section of the bearing structure and the corresponding panel will be made integral with an arm collaborating with the sensor. The sensors will be connected electrically or in other ways to a display device, where, for example, a luminous display corresponds to each panel in a precise position, so that a complete picture of the facade may be had at any moment. In particular, a device will be located on each floor of the building, to which the sensors relating to the panels on that floor could be connected.

The new system allows constant, complete monitoring of the facade, so that it is possible to act in time on the unsafe panels, thus increasing the degree of safety.

One embodiment of the invention will now be described, with reference to the enclosed drawings, in which.

Figure 1:
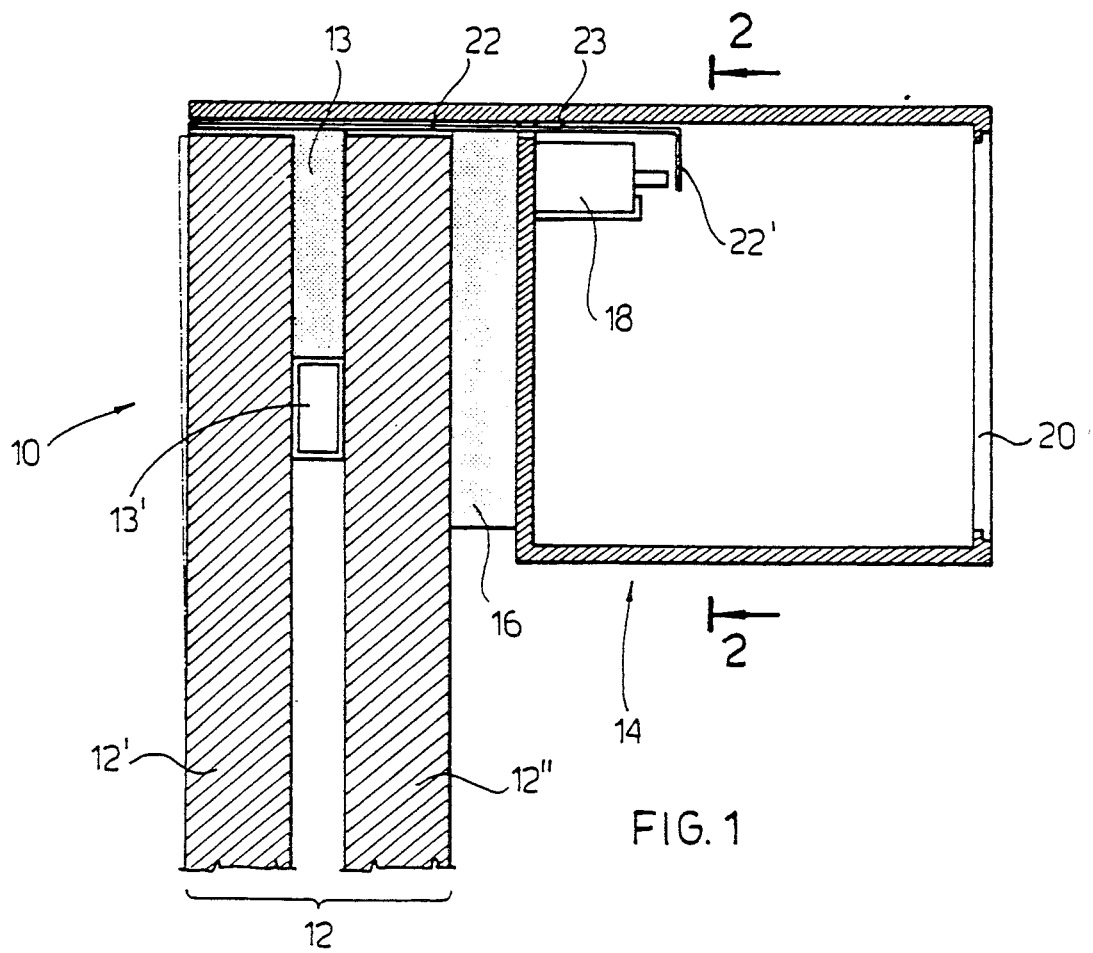
FIG. 1 is a vertical broken section across a double-glazed panel mounted on a bearing structure of the structural facade and comprising the sensor according to the invention.
Figure 2:
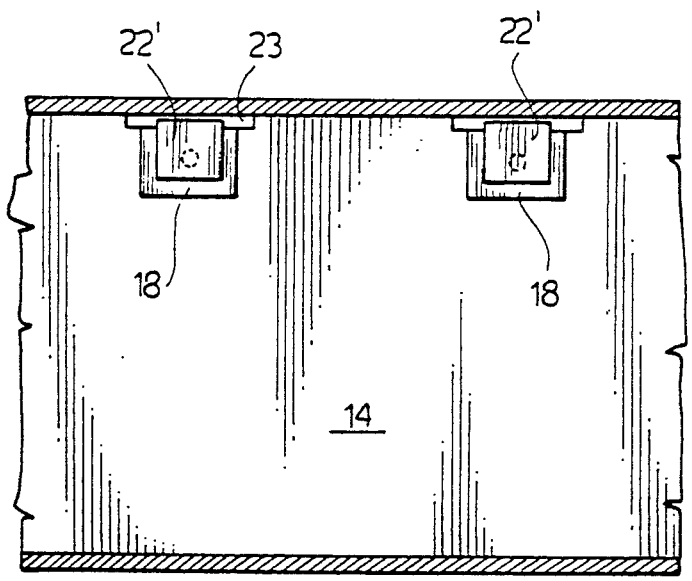
FIG. 2 is a section along 2—2 in FIG. 1.

With reference first to FIGS. 1 and 2, the overall system according to the invention is shown with 10 and comprises a panel 12, made integral with a bearing structure 14 of the panels by means of a sealant 16 of a type already known. In this case the panel 12 consists of a glass chamber comprising two glass panes 12' and 12", joined by a sealant 13 and separated by a spacer 13'. The sealant 16 (as can be the case of 13) is usually a silicone sealant. The structure 14 comprises a box section. Inside this, on one wall, screwed to or placed in a prepared niche, a sensor 18 is located of any known type, for example inductive, capacitive, either mechanical or optical. On one face of the section 14 a window 20 may be made, closable with a small block or cover, for placing the sensor. An arm 22 bent in the shape of an L collaborates with the sensor 18, its end 22' being opposite the sensor and normally spaced from it. The arm 22 is integral (by means of any known system; a sealant for example) with the panel 12, for example is secured to the pane 12', and extends through a slot 23 made in the box part of the structure. Preferably, as seen in FIG. 2, two or more sensors can be provided for each panel. Each sensor 18 is connected to a signalling panel (not shown) by means of connections (not shown) within the reach of any technician in the field.

Preferably the sensor or sensors are applied in correspondence with the upper edge of each panel, as shown in the drawings. However, it is possible to have sensors applied also to the lower edge or the sides of the panel.

The sensor will be appropriately calibrated so as not to give false signals in windy conditions.

In normal or windy conditions, then, there will be no signals on the display.

When the connection consisting of the sealant 16 (or the reflective coating, or the anodized or painted coating) begins to yield, the panel 12 will first undergo a very slight oscillation outwards, more evident on its upper edge (the dotted line in FIG. 1) and the arm 22 will operate the sensor which will switch on the corresponding light on the display panel; in this way there will be a clear alarm signal together with the indication of the position of the unsafe panel. It should be noted that the signalling of the shift of the panel takes place when such a shift is not yet dangerous, and, in addition, the arm 22 can collaborate in holding back the panel.

The arm 22 is made from rigid metallic material or preferably from incombustible material.

In FIGS. 3 to 6, various other types of panel mountings are shown.

In the various figures, similar elements bear the same reference numbers.

Figure 3:
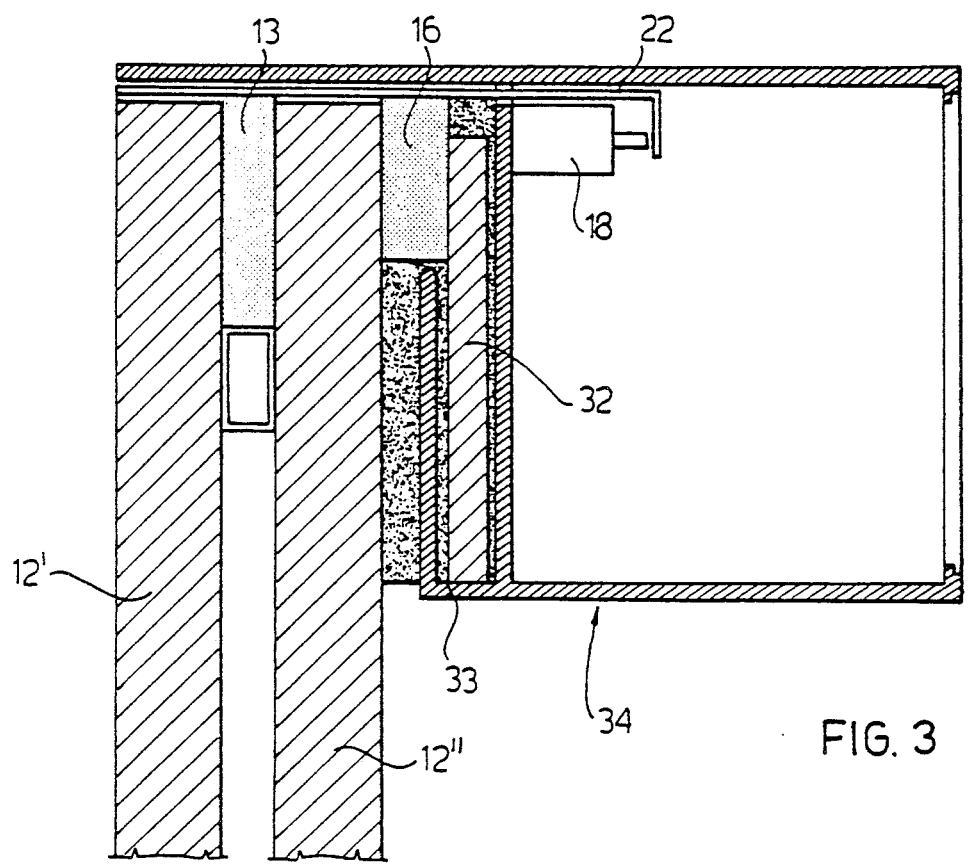
FIG. 3 is a section, similar to FIG. 1, of another type of panel mounting.

With reference to FIG. 3, the panel is supported on section 34 of the structure by means of an already known double glazing system; that is, the sealant 16 is placed between the pane 12" and an auxiliary glass pane 32, the latter being held mechanically in a seat formed by an arm 33 of the section 34. The mounting of the sensor is like that described with reference to FIG. 1.

Figure 4:
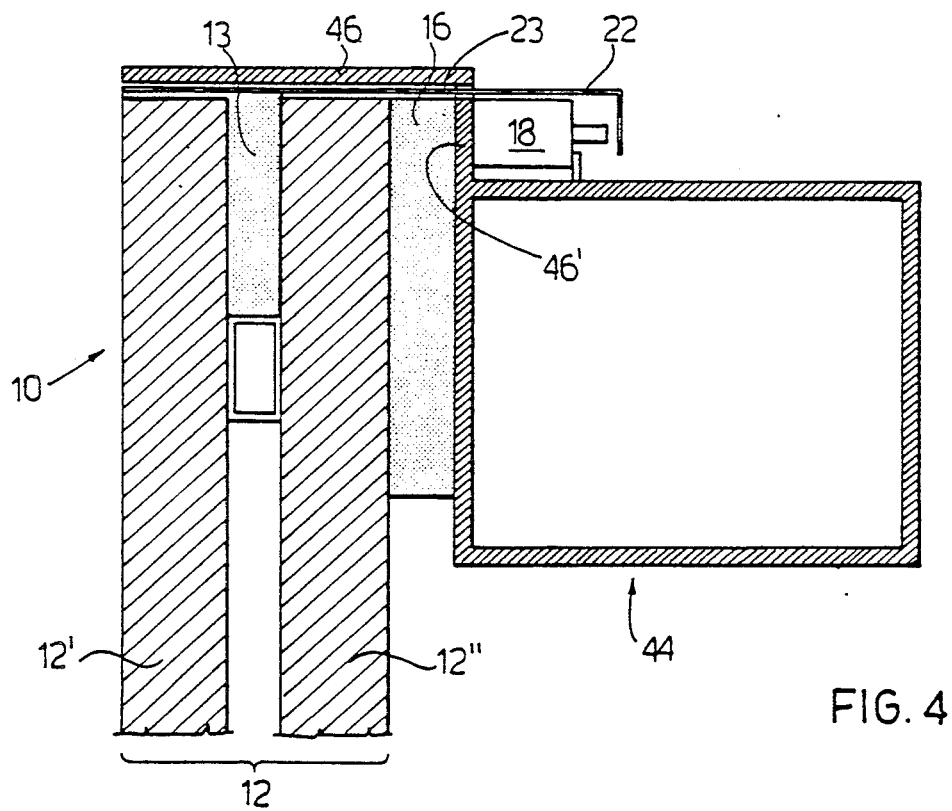
FIG. 4 is a section, similar to FIG. 1, of a third type of mounting.

In FIG. 4, the section 44 of the structure has a part 46, extending upwards and therefore outwards for a length 46' and which receives the glass panel. In this case the sensor is applied to the length 46' of the section, without any need to open the box part of the section. In this case also the sensor can be screwed or received into a niche provided for this purpose, or fixed in any way within the reach of a technician in the field.

Figure 5:
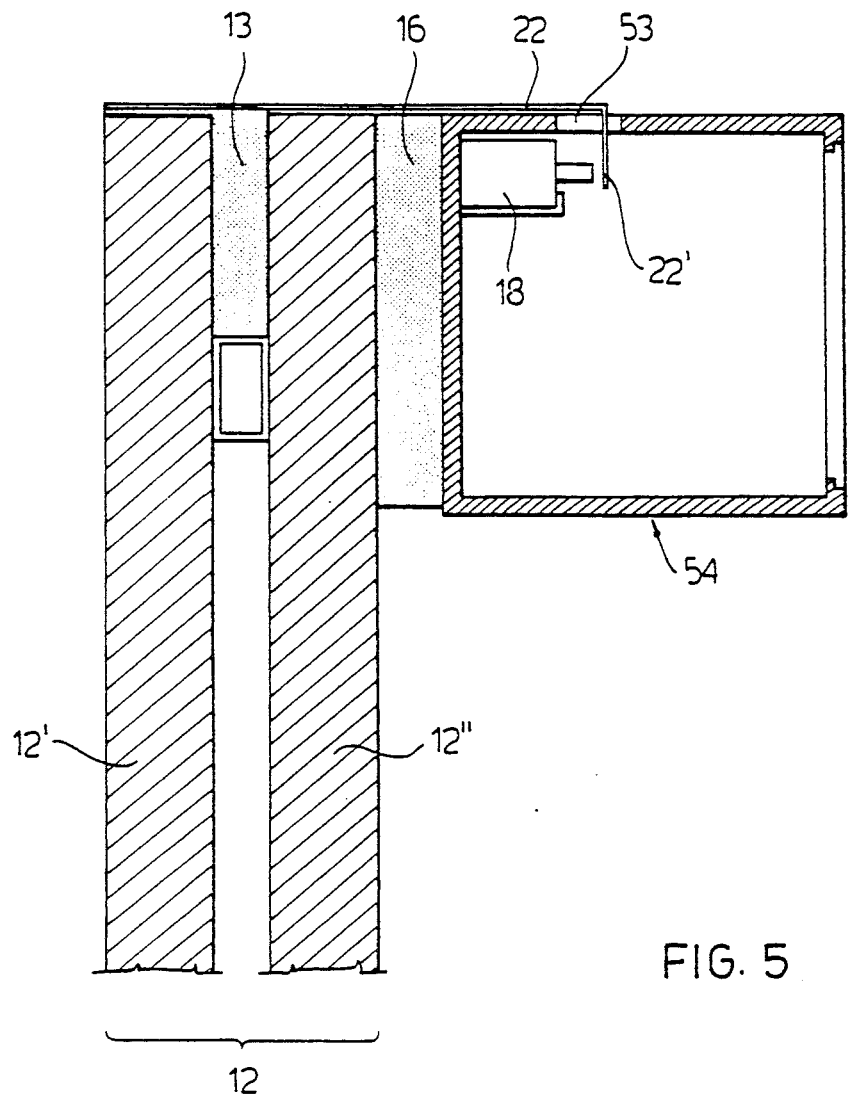
FIG. 5 is a section, similar to FIG. 1, of a fourth type of mounting.

In the embodiment shown in FIG. 5, the sensor is applied inside the box section 54, while the arm 22 is outside of the same, except for the bent part 22', which penetrates it through the slot 53 made in the upper part of the section and extending for a length sufficient to allow the arm 22 to be moved at least horizontally on the plane of the drawing.

Figure 6:
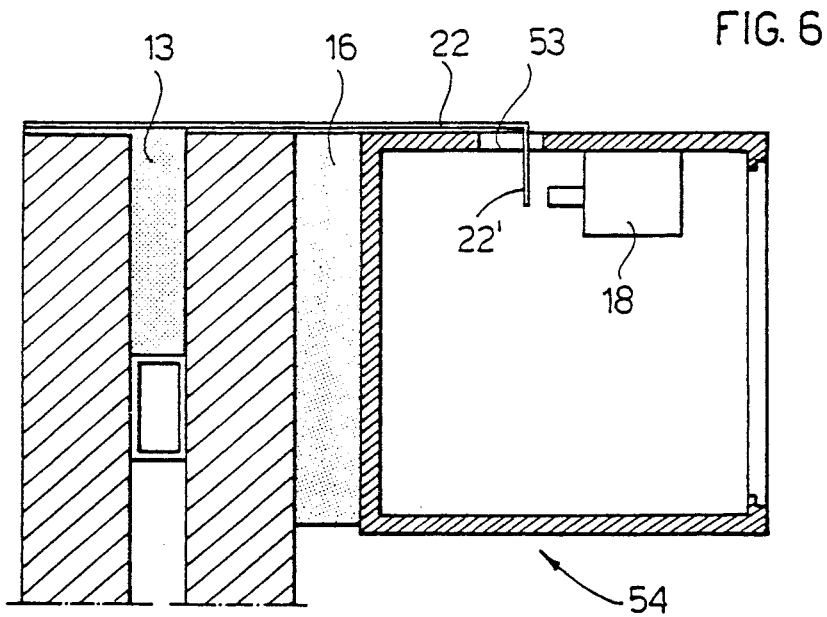
FIG. 6 is a section, similar to FIG. 5, wherein the sensor is positioned in a different location.

It should be pointed out that, although in FIGS. 1-5 the sensors 18 have been drawn as positioned at a location between panel 12 and bent end 22' of arm 22, they could be positioned to cooperate with the other side of bent end 22', as shown in FIG. 6. The other elements of FIG. 6 are the same as in the other figures and are not described in detail.

Arm 22 can be a one-piece element or it may comprise a plurality of parts, as may be preferred for assembling.

I claim:

1. A structural facade system comprising a flat facing panel (12) lying in a plane, a bearing structure (14) which carries said panel, a sealant (16) between said bearing structure and said panel, a sensor (18) mounted on the bearing structure, and a sensor operating element (22) mounted on the panel, said sensor operating element comprising an arm secured to the panel and extending transversely of said plane, said arm terminating in an end remote from the panel which cooperates with said sensor such that movement of said end relative to said sensor causes said sensor to detect movement of said panel in a direction transverse to said plane.

2. A system as claimed in claim 1, in which said sensor operating element is secured to an upper edge of the panel.

3. A system as claimed in claim 1, said bearing structure comprising a box section and said sensor being disposed inside said box section, said arm passing through a slot in said box section.

4. A system as claimed in claim 1, wherein said bearing structure comprises a box section having a part (46) extending upwardly therefrom and carrying said sensor.

5. A system as claimed in claim 1, in which said bearing structure comprises a box section containing said sensor, said box section having a window providing access to said sensor.

6. A system as claimed in claim 1, said end of said arm being engageable with said sensor to limit movement of said panel away from said bearing structure.

* * * * *